Oct. 19, 1954  A. E. DENTLER  2,692,057
FRICTION SHOCK ABSORBING MECHANISM FOR RAILWAY CARS
Filed June 7, 1950  2 Sheets-Sheet 1
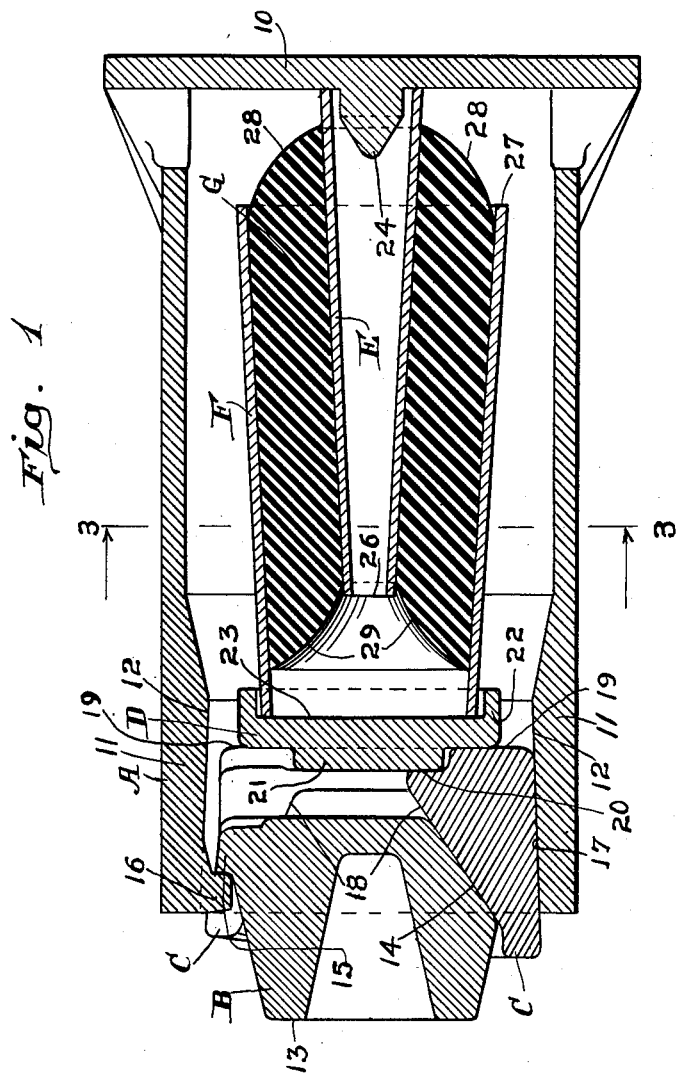
Inventor:
Arnold E. Dentler.
By Henry Fuchs
Attys.

Oct. 19, 1954      A. E. DENTLER      2,692,057
FRICTION SHOCK ABSORBING MECHANISM FOR RAILWAY CARS
Filed June 7, 1950      2 Sheets-Sheet 2
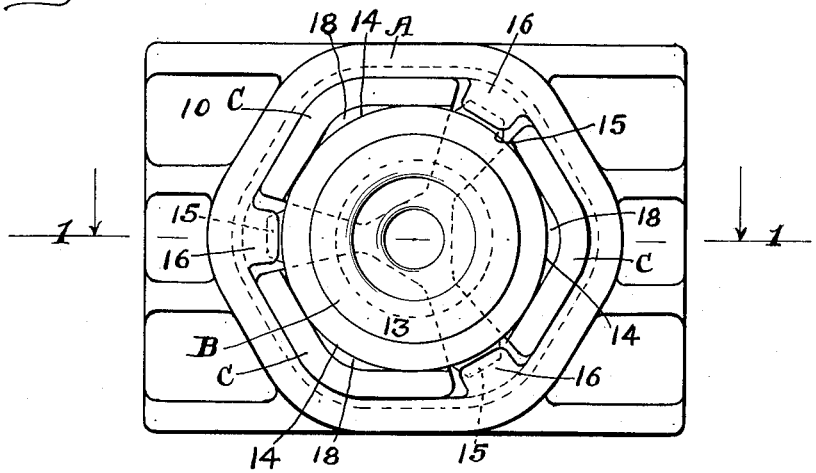
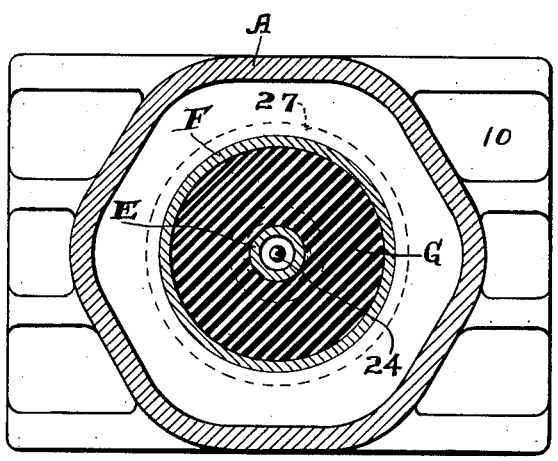
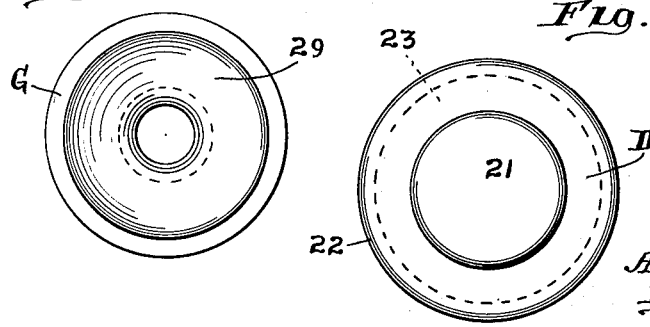
Inventor:
Arnold E. Dentler,
By Henry Fuchs
Atty Patented Oct. 19, 1954

2,692,057

UNITED STATES PATENT OFFICE 2,692,057

FRICTION SHOCK ABSORBING MECHANISM FOR RAILWAY CARS

Arnold E. Dentler, La Grange, Ill., assignor to W. H. Miner, Inc., Chicago, Ill., a corporation of Delaware Application June 7, 1950, Serial No. 166,634

1 Claim. (Cl. 213—22)

This invention relates to improvements in friction shock absorbing mechanisms especially adapted for draft riggings of railway cars.

One object of the invention is to provide a friction shock absorbing mechanism of high capacity comprising a friction casing, friction shoes slidingly telescoped within the casing, a wedge pressure transmitting member in wedging engagement with the shoes, and means yieldingly opposing movement of the shoes inwardly of the casing, wherein the yielding means for opposing movement of the shoes comprises a rubber element subjected to both compression and shear during compression of the mechanism.

Other objects of the invention will more clearly appear from the description and claim hereinafter following.

In the accompanying drawings forming a part of this specification, Figure 1 is a horizontal, longitudinal sectional view of my improved friction shock absorbing mechanism, said section corresponding substantially to the line 1—1 of Figure 2. Figure 2 is an elevational view looking from right to life in Figure 1. Figure 3 is a transverse, vertical sectional view, corresponding substantially to the line 3—3 of Figure 1. Figure 4 is an elevational view of the rubber cushioning element of my improved mechanism, looking from left to right in Figure 1. Figure 5 is an elevational view of the follower disc of my improved mechanism, looking from left to right in Figure 1.

Referring to the drawings, my improved shock absorbing mechanism comprises broadly a friction casing A, a wedge B, three friction shoes C—C—C, a follower disc D, an inner tubular member E, an outer tubular member F, and a rubber element G between said inner and outer tubular members and vulcanized to the same.

The friction casing A is in the form of a tubular member of hexagonal, transverse cross section, open at one end and closed at its other end by a transverse wall 10. The wall 10 is preferably extended outwardly beyond opposite sides of the casing to provide an integral follower member adapted to cooperate with the corresponding stop lugs of the draft rigging of a railway car. At the open end of the casing A, the side walls are inwardly thickened, as shown in Figure 1, to provide a friction shell section 11, presenting three lengthwise extending, interior friction surfaces 12—12—12 of V-shaped, transverse cross section. The surfaces 12—12—12 preferably converge inwardly of the casing, as shown in Figure 1.

The wedge B is in the form of a block having a flat outer end face 13, adapted to receive the actuating force. At its inner end, the wedge B has three wedge faces 14—14—14, preferably of V-shaped, transverse cross section, which converge inwardly of the mechanism and cooperate with the shoes C—C—C. Outward movement of the wedge B with respect to the casing A is limited by radially outwardly projecting lugs 15—15—15 on said wedge, extending between adjacent shoes C—C and engaging in back of interior stop lugs 16—16—16 on the casing A.

The shoes C—C—C have lengthwise extending, V-shaped friction surfaces 17—17—17 on their outer sides, which are in sliding contact with the friction surfaces 12—12—12 of the casing A. On their inner sides, the shoes C—C—C have V-shaped wedge faces 18—18—18 which are engaged, respectively, by the wedge faces 14—14—14 of the wedge B. The shoes C—C—C have flat, transverse, inner end faces 19—19—19, which are cut out at the inner sides of the shoes to provide a seat 20 for a purpose hereinafter pointed out.

The follower disc D is in the form of a heavy, circular plate, bearing on the flat inner end faces 19—19—19 of the shoes C—C—C, and having an outwardly projecting, central boss 21, which is engaged in the seat 20 of said shoes. At its inner side, the disc D is provided with a peripheral, cylindrical flange 22, which surrounds the inner end face 23 of said disc, which end face is substantially flat, as shown.

The inner tubular member E is formed of heavy sheet metal. At the inner end, the member E bears on the inner side of the wall 10 of the casing A and is held centered by an inwardly projecting boss 24 on said wall, extending into the end of said member. As shown in Figure 1, the tubular member E is of greater diameter at the inner than at the outer end. In other words, the member E tapers toward its outer end. As shown in Figure 1, the outer end of the member E, which end is indicated by 26, is spaced an appreciable distance from the follower disc D.

The outer tubular member F is also formed of heavy sheet metal, is of considerably larger diameter than the member E, and surrounds the latter. At its outer end, the member F bears on the follower disc D, the same abutting the flat end face 23 of said follower, and being surrounded by the flange 22 which holds the member F centered. The member F is of greater interior diameter at its inner than at its outer end, that is, it is tapered toward its outer end. The two tubular members E and F are preferably tapered to the same degree so that the walls of said members are parallel to each other. The inner end of the member F, which end is indicated by 27, is spaced from the wall 10 of the casing A, the distance between said member and the wall 10 being substantially the same as the distance between the end 26 of the member E and the disc D.

The rubber element G is disposed within the tubular member F and surrounds the tubular member E, being in the form of a thick tube or sleeve, and having its outer and inner sides vulcanized to said members F and E, respectively. The inner end of the rubber element G projects beyond the inner end 27 of the tubular member F, said end being tapered and rounded off, as indicated at 28, and terminating short of the inner end of the tubular member E. The outer end of the rubber element G projects beyond the outer end 26 of the tubular member E, said end being tapered and rounded off, as indicated at 29, and terminating short of the outer end of the tubular member F.

The operation of my improved shock absorbing mechanism is as follows: Upon compression of the mechanism, the wedge B is forced inwardly of the casing A, wedging the shoes apart and sliding the same inwardly along the friction surfaces of the casing, opposed by the resistance afforded by the rubber element G. High frictional resistance is thus provided to absorb the shocks. During this action, the tubular member F is moved rearwardly with respect to the tubular member E. Inasmuch as the rubber element G is vulcanized to these tubular members, the same is placed under shear as the member F is forced inwardly. During this action of the rubber element G, the same, in addition to being subjected to shear, is compressed laterally, due to the wedging action between the tapered tubular members F and E.

I claim:

In a shock absorbing mechanism, the combination with a friction casing having interior friction surfaces at its front end and a transverse abutment wall at its rear end; of friction shoes telescoped within the casing in sliding engagement with the friction surfaces thereof; a wedge in wedging engagement with said shoes; and yielding means within the casing interposed between the inner ends of said shoes and said abutment wall of the casing, said yielding means comprising an outwardly tapered tubular rubber sleeve, an outwardly tapered tubular member within which said sleeve and to the exterior side of which said rubber sleeve is interiorly vulcanized, and a second outwardly tapered tubular member surrounding said rubber sleeve and to the interior side of which the exterior side of said rubber sleeve is vulcanized, the rear end portion of said rubber sleeve at the side thereof which is vulcanized to said first named tubular member projecting rearwardly beyond the rear end of said second named tubular member, the rear end of said first named tubular member projecting rearwardly beyond said rubber sleeve, the front end portion of said rubber sleeve at the side thereof which is vulcanized to said second named member projecting forwardly beyond the front end of said first named tubular member, and the front end of said second named tubular member projecting forwardly beyond said rubber sleeve.

References Cited in the file of this patent

UNITED STATES PATENTS

| Number | Name | Date |
| --- | --- | --- |
| 1,880,504 | Shields | Oct. 4, 1932 |
| 2,038,673 | Olander | Apr. 28, 1936 |
| 2,216,429 | Blomberg | Oct. 1, 1940 |
| 2,482,488 | Julien | Sept. 20, 1949 |
| 2,506,707 | Dath | May 9, 1950 |
| 2,549,036 | Withall | Apr. 17, 1951 |
| 2,588,488 | Dath | Mar. 11, 1952 |

FOREIGN PATENTS

| Number | Country | Date |
| --- | --- | --- |
| 756,981 | France | June 14, 1933 |